US009729687B2

(12) United States Patent
Hsieh et al.

(10) Patent No.: US 9,729,687 B2
(45) Date of Patent: *Aug. 8, 2017

(54) WEARABLE COMMUNICATION DEVICE

(71) Applicant: SilverPlus, Inc., Irvine, CA (US)

(72) Inventors: Jeffrey Hsieh, Dove Canyon, CA (US); Dennis Kwan, San Diego, CA (US); Suresh Singamsetty, Aliso Viejo, CA (US); Stanley Kinsey, Rancho Santa Fe, CA (US)

(73) Assignee: SilverPlus, Inc., Irvine, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/964,932

(22) Filed: Aug. 12, 2013

(65) Prior Publication Data
US 2014/0045480 A1 Feb. 13, 2014

Related U.S. Application Data

(60) Provisional application No. 61/682,804, filed on Aug. 14, 2012, provisional application No. 61/682,814, (Continued)

(51) Int. Cl.
H04W 4/00 (2009.01)
H04M 3/42 (2006.01)
(Continued)

(52) U.S. Cl.
CPC .......... H04M 1/0279 (2013.01); G04G 21/04 (2013.01); G04G 21/06 (2013.01);
(Continued)

(58) Field of Classification Search
CPC ..... H04W 88/06; H04W 84/12; H04W 48/10; H04W 4/08; H04M 1/6066;
(Continued)

(56) References Cited

U.S. PATENT DOCUMENTS 4,084,401 A * 4/1978 Belardi .................. G04G 9/107
368/241
7,187,908 B2 3/2007 Fujisawa et al.
(Continued)

FOREIGN PATENT DOCUMENTS

WO     WO 0176404     10/2001

OTHER PUBLICATIONS

Litepoint Co. ("Bluetooth Low Energy" Jun. 2012).*
("Bluetooth LE with BlueGiga devboard (BLE112)" http://electronics.stackexchange.com/questions/45447/bluetooth-le-with-bluegiga-devboard-ble112—Oct. 2012.*

Primary Examiner — Dung Hong
(74) Attorney, Agent, or Firm — Finnegan, Henderson, Farabow, Garrett & Dunner LLP

(57) ABSTRACT

Wearable communication devices, e.g. implemented in a watch, using short range communication e.g. to a cell phone allow a user to talk and listen, place and answer calls, send and receive text messages, initiate voice commands to mobile search for information and find locations, and be notified of incoming calls, texts, and events, all while a phone is nearby but not visible. Notification is performed with vibration, an LED light or OLED text display of incoming calls, texts, and calendar events. It allows communicating hands-free. The watches can be directly connected to a smartphone allowing using the watch as "remote control" for home appliances or any other devices via voice and buttons. Motion sensors such as accelerometer, magnetometer and gyroscope, together with audio generation device can be used for gaming applications.

53 Claims, 6 Drawing Sheets

Related U.S. Application Data filed on Aug. 14, 2012, provisional application No. 61/681,791, filed on Aug. 10, 2012.

(51) Int. Cl.

| | |
|---|---|
| *H04M 1/02* | (2006.01) |
| *H04W 88/06* | (2009.01) |
| *G06F 1/16* | (2006.01) |
| *H04B 1/38* | (2015.01) |
| *H04M 1/725* | (2006.01) |
| *G04G 21/04* | (2013.01) |
| *G04G 21/06* | (2010.01) |
| *H04B 1/3827* | (2015.01) |

(52) U.S. Cl.
CPC ............ *G06F 1/163* (2013.01); *G06F 1/1643* (2013.01); *H04B 1/38* (2013.01); *H04M 1/7253* (2013.01); *H04W 88/06* (2013.01); *H04B 2001/3861* (2013.01); *H04M 2250/02* (2013.01); *H04M 2250/12* (2013.01); *Y02B 60/50* (2013.01)

(58) Field of Classification Search
CPC .. H04M 1/7253; H04M 1/035; H04M 1/6041; H04M 2250/02; H04M 2201/40; H04M 2201/60; H04M 3/42221; H04M 1/274516; H04B 1/38
USPC ................ 455/414.1, 414.3, 414.4, 416, 466
See application file for complete search history.

(56) References Cited

U.S. PATENT DOCUMENTS

| | | | |
|---|---|---|---|
| 8,854,298 B2 * | 10/2014 | Osman | A63F 13/92 |
| | | | 345/156 |
| 8,855,729 B1 * | 10/2014 | Pattikonda | H04B 1/385 |
| | | | 455/550.1 |
| 2009/0076827 A1 * | 3/2009 | Bulitta | 704/275 |
| 2009/0204409 A1 * | 8/2009 | Mozer | G10L 15/30 |
| | | | 704/275 |
| 2009/0231960 A1 | 9/2009 | Hutcheson | |
| 2011/0021142 A1 * | 1/2011 | Desai | H04W 8/005 |
| | | | 455/41.2 |
| 2011/0021143 A1 * | 1/2011 | Kapur | H04L 63/0464 |
| | | | 455/41.2 |
| 2011/0059769 A1 * | 3/2011 | Brunolli | G08C 17/02 |
| | | | 455/556.1 |
| 2011/0126014 A1 * | 5/2011 | Camp, Jr. | H04M 1/7253 |
| | | | 713/171 |
| 2012/0178471 A1 * | 7/2012 | Kainulainen et al. | 455/456.1 |
| 2012/0194976 A1 * | 8/2012 | Golko et al. | 361/679.01 |
| 2012/0238851 A1 * | 9/2012 | Kamen | A61M 5/14244 |
| | | | 600/365 |
| 2013/0059660 A1 * | 3/2013 | Zalewski | G06F 3/017 |
| | | | 463/36 |
| 2013/0216065 A1 * | 8/2013 | Nguyen | 381/94.1 |
| 2014/0036643 A1 * | 2/2014 | Messenger et al. | 368/251 |
| 2014/0171156 A1 * | 6/2014 | Pattikonda et al. | 455/569.1 |

* cited by examiner

WEARABLE COMMUNICATION DEVICE

This application claims priority to U.S. provisional patent application Ser. No. 61/682,804 filed Aug. 14, 2012, which is owned by a common assignee, and which is herein incorporated by reference in its entirety.

This application claims priority to U.S. provisional patent application Ser. No. 61/682,814 filed Aug. 14, 2012, which is owned by a common assignee, and which is herein incorporated by reference in its entirety.

This application claims priority to U.S. provisional patent application Ser. No. 61/681,791 filed Aug. 10, 2012, which is owned by a common assignee, and which is herein incorporated by reference in its entirety.

BACKGROUND (1) Field of the Disclosure

This disclosure relates generally to electronic mobile devices and relates in particular to wearable communication devices using short range communication to a cell phone or other portable electronic device.

(2) Background of Disclosure

Notification watches are used for some time now, which can receive information from portable electronic devices such as cell phones. They notify a user when a mobile phone rings by a vibrating or alerting for specific issues. They can pass through from the mobile phone information such as emails, SMS, calendar events and caller Ids.

SUMMARY

A principal object of the present disclosure is to allow use of a wearable communication device, such as a watch (and hereinafter referred to as, but not limited to, a watch) to talk, listen, initiate voice commands, and be notified with vibration, an LED light and OLED text display of incoming calls, texts, and calendar events, all while a phone is nearby but not visible, such as in a pocket or purse.

A further object of the present disclosure is to be notified with vibration, an LED light and OLED text display of incoming calls, texts, and calendar events, all without a phone being visible.

A further object of the present disclosure is to put a wearable Bluetooth communication device into a watch that would connect to a cell phone.

A further object of the present disclosure is to achieve a watch enabling a hands-free communication with a cell phone.

In accordance with the objects of this disclosure, a wearable communication device configured to talk and to listen, place and answer calls, send and receive text messages, initiate voice commands to mobile search for information and to find locations, and be notified of incoming calls, texts, and events, all while a mobile phone is nearby has been achieved, firstly comprising a display to show information, one or more function buttons, and a near-field short distance wireless communication chipset, wherein the near-field short distance wireless communication chipset is used for communication with the phone. Furthermore the wearable communication device comprises one or more buttons, which are assigned to functions of the communication device, a speakerphone means configured to make and receive phone calls via the mobile phone comprising a microphone and a loudspeaker device and to accept voice commands, an alerting means to alert a user of the wearable communication device to consider an action, a movement sensing means to initiate functions of the communication device by moving the communication device, and a processor controlling operation of the communication device.

In accordance with the objects of this disclosure a method to achieve a wearable communication device configured to talk and to listen, place and answer calls, send and receive text messages, initiate voice commands to mobile search for information and to find locations, and be notified of incoming calls, texts, and events has been disclosed. The method disclosed comprises the steps of: (1) deploying a mobile phone within reach of a near-field short distance wireless communication chipset used for communication between the wearable communication device and the mobile phone, (2) deploying the near-field short distance wireless communication chipset in the wearable communication device, and (3) deploying one or more buttons, on the communication device which are assigned to functions of the communication device. Furthermore the method comprises the steps of: (4) connecting the mobile phone to the internet via Wi-Fi or to mobile phone networks, and (5) configure the wearable communication device to enable to talking and listening, placing and answering phone calls, sending and receiving text messages, initiating voice commands to mobile search for information and to find locations, and being notified of incoming calls, texts, and events.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present disclosure present a wearable communication device, which can be, for example, a watch (and hereinafter referred to, though not limited to, as a watch), comprising functions enabling to talk and to listen, place and answer calls, send and receive text messages, initiate voice commands to mobile search for information and to find locations, and be notified of incoming calls, texts, and events, all while a phone is nearby but not visible, as when it is in the user's pocket or purse or, in other words, within the reach of a near-field communication short-distance wireless communication module of the communication device for exchanging data.

Simple notification watches, in communication with a nearby cell phone, exist in the art, but a disadvantage of them is that they don't have the ability to actually answer, reply and connect to a caller without having to look at the cell phone.

It is a challenge to designers of communication devices to achieve a watch that allows a user to talk and to listen, place and answer calls, send and receive text messages, initiate voice commands to mobile search for information and to find locations, and be notified of incoming calls, texts, and events, all while a phone is in a pocket or purse.

Figure 1:
FIG. 1 shows a top view of an embodiment of a watch disclosed.

FIG. 1 shows a top view of a preferred embodiment of the disclosure. The watch 1 has an always-on analog watch movement. Alternatively a digital watch display, instead of an analog clock, can be used; there is no need to touch the screen to see the time. The upper half shows the hands of an analog Quartz watch. The watch comprises two physical buttons 3 and 4. Knob 2 can be used to adjust the time of day. Button 3 is an upper command button; button 4 is a lower select button.

The buttons 3 and 4 are programmable buttons, configured by the user via either (a) a web portal or (b) a smartphone application. Pre-programmed configurations can include "social", "messaging/tweet", or "emergency". Other pre-programmed configurations are possible, such as for example: in idle state, short press a button to activate voice recognition, long press to call last number dialed, OR, short press to read new texts or messages, long press to send new texts or messages.

The table below shows examples of such pre-programmed configurations. The functions in the table are determined by the state of the watch, together with the duration and number of times the button is pressed:

| CONFIG | TOP BUTTON FUNCTIONS | BOTTOM BUTTON FUNCTIONS |
|---|---|---|
| Default | Voice command activation, make call, receive call, terminate call, pairing with phone. | Activate status display, volume control. |
| Social | Read and send text messages | Display new postings from social websites: e.g., Facebook, twitter. |
| Safety | Start/stop calling pre-programmed numbers. | Call 911 |
| Gaming/ remote control | Start/Stop 3D motion reporting (for cursor control) | Left/right mouse button |
| Audio | Start/stop playing music | Volume control |
| Record audio | Activate voice recording | Terminate voice recording |

It should be noted that the table above shows non-limiting examples. The watch may have one button only or more than two buttons and an assignment of functions to the one or more buttons can be performed on many other ways.

The preferred embodiment has an OLED display and an RGB, or another color space LED light. Alternatively an LCD display, as e.g. one line LCD dot matrix, can be used. The one-line digital display of FIG. 1 shows a phone number because the most basic function is just to show the number of an incoming call. It should be noted that the display can also show alphanumeric messages, icons, and the like.

The communication is performed using a Bluetooth, or other near-field short distance wireless communication technology, chip. Bluetooth is a proprietary open wireless technology standard for exchanging data over short distances (using short-wavelength radio transmissions in the ISM band from 2400-2480 MHz) from fixed and mobile devices, creating personal area networks (PANs) with high levels of security. It can connect several devices, overcoming problems of synchronization. For example, a chip meeting the specifications of Bluetooth 4.0 can be used, together with a microphone and speaker. Speakerphone capabilities are built into the watch such as echo cancellation and make/receive calls. In the preferred embodiment a piezo speaker has been deployed. Other types of speakers are possible as well.

The two buttons 3 and 4 control all functions of the wearable communication device 1 other than setting time, which is performed by knob 2. In one exemplary application, one button can be used to activate voice recognition, and be used to, for example, initiate a call, by the user speaking the command "call home".

In order to communicate an alert a vibrating motor is deployed inside the watch. Furthermore the watch comprises a 3-axis accelerometer.

Moreover motion sensors such as a magnetometer and gyroscope, together with an audio generation device can be used for gaming applications.

Figure 4:
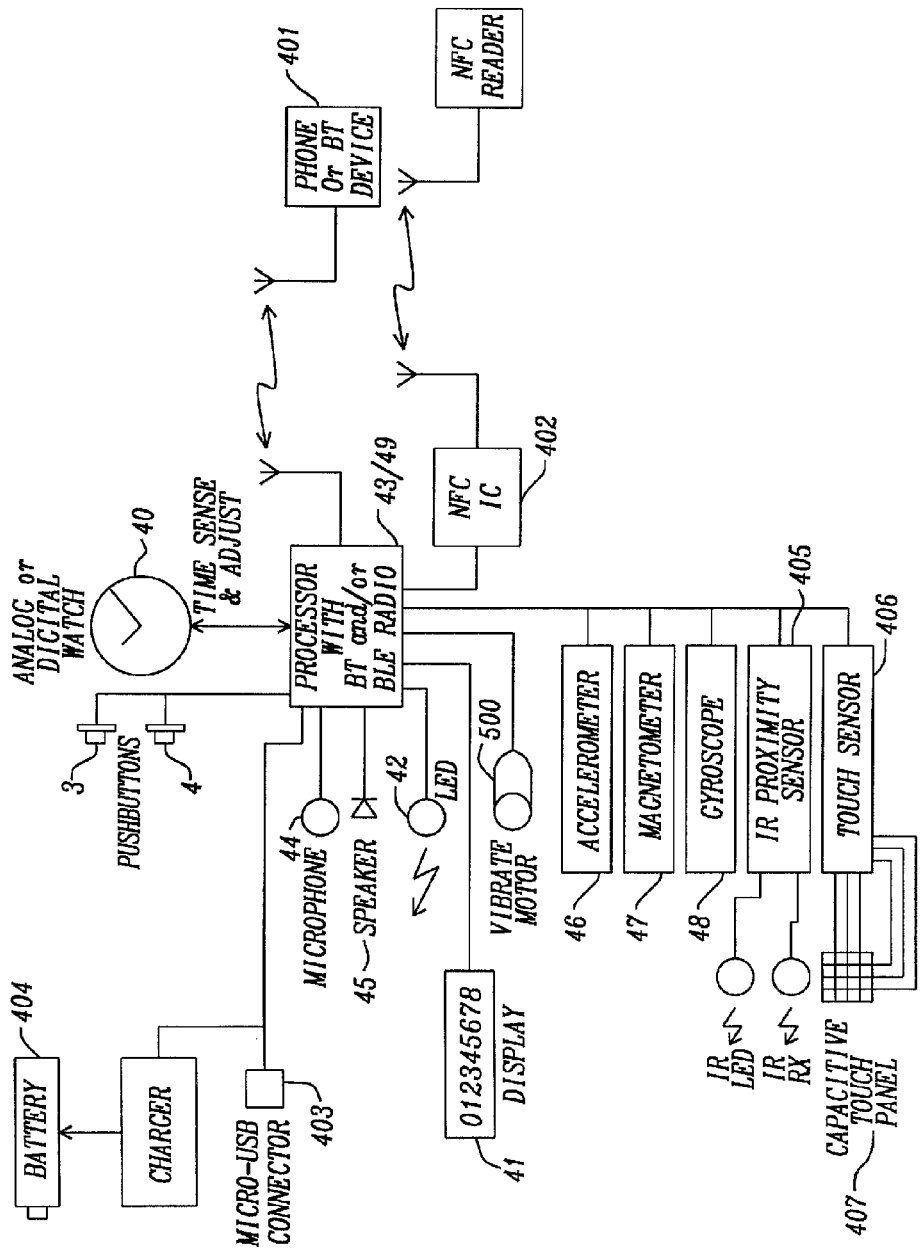
FIG. 4 shows the main components of the watch.

FIG. 4 shows a summary of the main components of the watch and their interconnections. There is the watch 40 having an analog or a digital display. The watch comprises two physical buttons 3 and 4. Knob 2 can be used to adjust the time of day. Button 3 is an upper command button; button 4 is a lower select button. Furthermore there is a one-line digital display 41, which can display a phone number, alphanumeric messages, icons, and the like. The display may be an LCD or an OLED display. Furthermore there may be a LED 42 providing by different colors status information.

In the case of an analog watch display, the analog watch movements may contain mechanisms for the watch hands to be adjusted according to signals sent by the Processor 43. it may also contain mechanisms for the hand positions to be sensed by the Processor. The analog watch may therefore be set accurately by the Processor, which receives time information over Bluetooth from the phone.

The processor 43 controls the operation of the watch disclosed including a microphone 44, a speaker 45, a vibration motor 500, motion sensors as a 3-axis accelerometer 46, a magnetometer 47, a gyroscope 48, an IR proximity sensor 405, and a touch sensor 406 connected to a capacitive touch panel 407.

Furthermore the processor 43 controls a Bluetooth (BT) chipset 49 which may comprise a regular BT chip and/or a Bluetooth low energy chip. Both used for communication to a phone, smartphone or another BT-device 401

Moreover a Near Field Communication (NFC) chip 402 can be provided in the watch disclosed. It allows "bump"-type feature to transfer data from a cell phone to the watch, for instance for admission control, as used e.g. on subways in Taiwan, China, or Tokyo subways to eliminate the need for a separate subway card. For this type of communication a radio-frequency identification (RFID) chip could also be used, wherein this RFID chip could be deployed either outside of the watch or on the watch-face.

Furthermore a regular BT chip and BLE (for Bluetooth Low Energy)-chip to allow for 2 different communication protocols (to allow e.g. SMS notifications together with voice calls) are implemented. Using BLE chips for messages may be advantageous for lower power consumption at the device.

That is, both a regular Bluetooth chip and a low-energy Bluetooth chip, possibly being in communication with each other, are incorporated. For instance, the regular BT chip communicates to the phone, while the BTLE chip communicates to sensors (such as in a home application). This means that both BT chips, BT low energy (LE) and non-LE BT chip may operate simultaneously for different functions. This configuration may be used as a bridge between sensors and smart phone applications and may be used also e.g. for automatically accessing services in the Internet as for instance for accessing-search engines like Google.

Figure 5A:
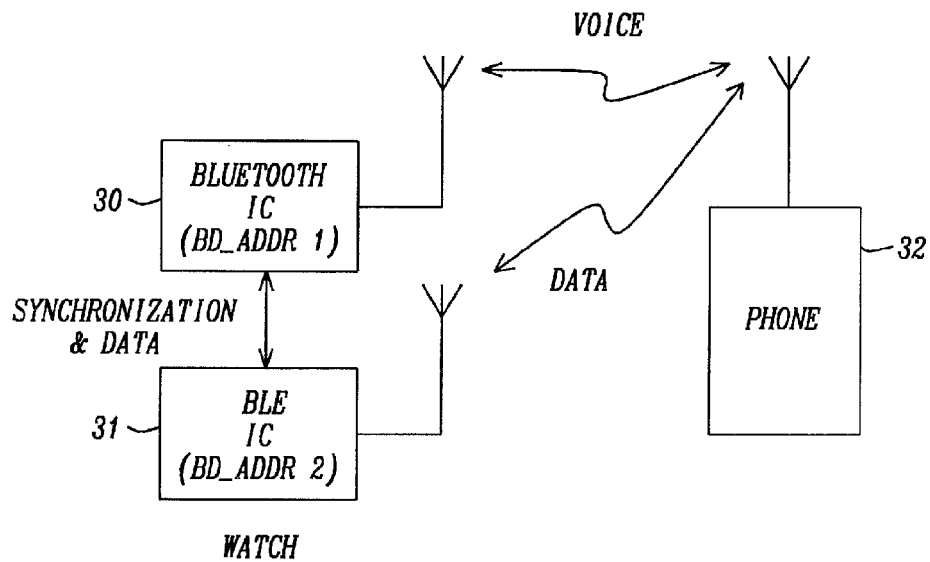
FIG. 5a shows an example of a communication between a chipset of the watch and the phone.

FIG. 5a shows an example of a communication between a chipset of the watch and the phone. Both chips 50 and 51 can synchronize and exchange data. The first chip 50 may receive voice information and the second chip may receive data. The voice information and the data are sent by the phone 52.

Figure 5B:
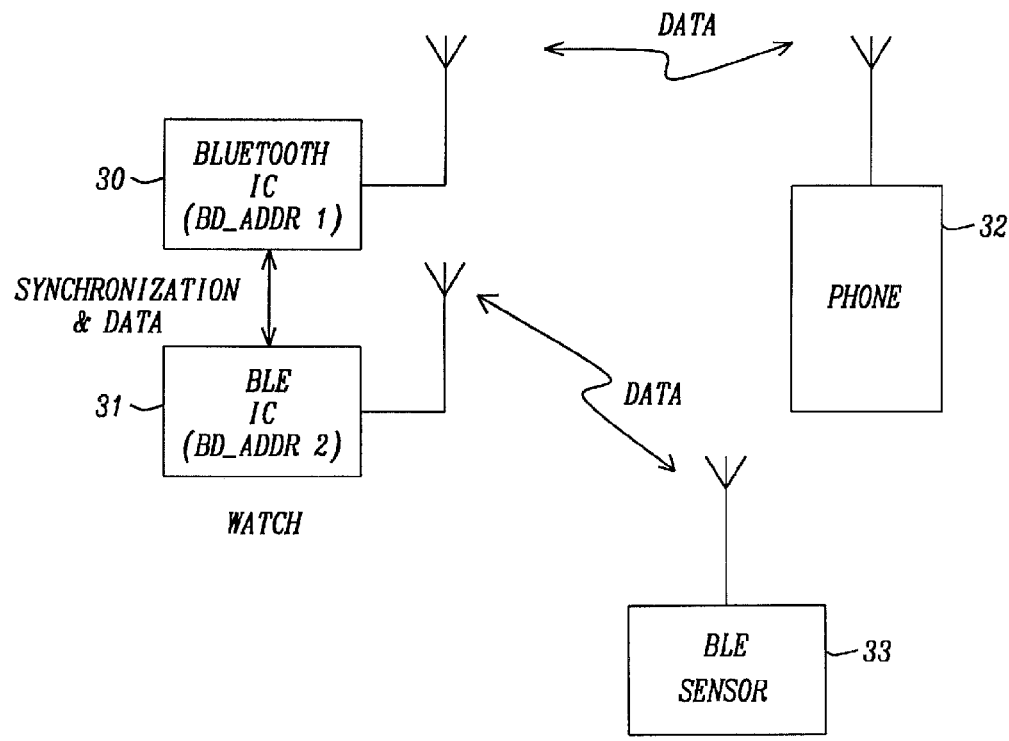
FIG. 5b shows an example of a communication between a chipset of the watch and the phone and a BLE sensor . . . .

FIG. 5b shows another example of a communication between a chipset of the watch and the phone and a BLE sensor. Both chips 50 and 51 can synchronize and exchange data. The first chip 50 may receive data from the phone 52 and the second chip 51 receives data from a Bluetooth sensor 53.

Alternatively both chips, regular BT chip and BILE chip, may operate sequentially, i.e. the watch moves back and forth between regular BT chip and BILE chip, to obtain power savings when operating with one BT only. For instance the BTLE chip may be used to receive text messages and the regular BT chip e.g. communicates to the phone for a voice phone call.

Figure 5C:
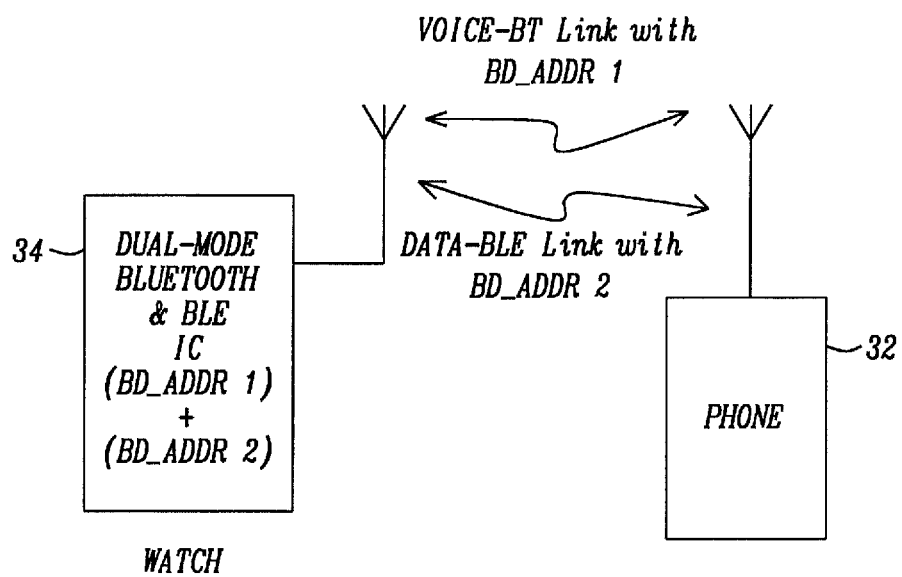
FIG. 5c shows another implementation using a single chip supporting dual mode BT and BLE.
Figure 5D:
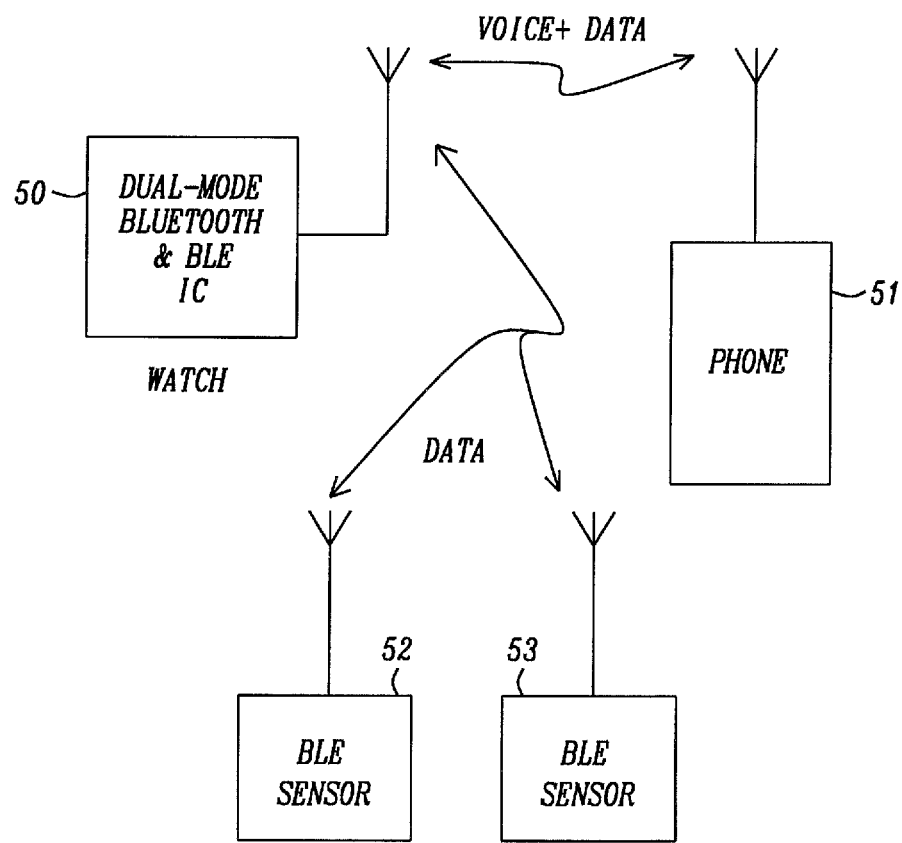
FIG. 5d illustrates simultaneous connections between an IC deployed on the watch to a phone and to BLE devices.

FIG. 5c shows another implementation using a single chip supporting dual mode BT and BLE with the one chip assuming two different Bluetooth Device addresses (BD_ADDR), one for BT and one for BLE, so that it appears as two different devices to a phone supporting BT and BLE, as shown in FIG. 5d below. This allows the phone to maintain connection to the device in both BT and BLE modes simultaneously, which may not be supported by some phones if the device appears as the same BT or BLE device with the single BD_ADDR.

FIG. 5d illustrates simultaneous connections between a dual mode Bluetooth and BLE IC 54 deployed on the watch to the phone 52 and BLE devices 55 and 56.

The different operation modes of both chips, i.e. simultaneously or sequentially, enables either power savings, or allows the communication of both two-way voice and data between the watch and the mobile phone.

These features of the watch allow connection to a mobile phone's voice command function but allow also connecting to an app placed on a smart phone. Therefore the watch is enabled to a separate set of voice command inputs to manage different functions and applications as e.g. outlined below.

Furthermore in a preferred embodiment of the disclosure voice recognition is implemented in the command watch disclosed. Generally, the disclosure provides extended functionality to BT devices.

It has to be noted that the watch is therefore enabled using the watch as input device for menu selection in a smart phone application (app). The watch provides I/O functionality for a smart phone, with no need to look at the phone display, i.e. the smart phone can be nearby but not visible, as when it is in the user's pocket or purse.

For the power supply of the watch is a micro USB-port 403 provided, which enables charging of the main battery 404. The main battery 404 provides power to all components of the watch requiring power.

Multiple similar devices can be synchronized via star or mesh network for multi-point motion sensing. For example, an arm-swing movement detected can cause a punching sound to be produced, in a "hand-combat" game. Two players may be networked with their watches synchronized, and depending on the velocity and 3-D locations of the watches, may be playing against each other with suitable sounds being generated to simulate the opponents being hit. Another example may be simulation of musical instrument sounds such as drum and guitar, and multiple players may engage in generating sounds synchronized with their watch movements, in a kind of "air-instruments" game, while background music is being played.

In summary general features of the wearable communication device for smartphones are that incoming Call Alerts are provided via Vibration, RGB LED and Caller ID Display, Furthermore incoming calls can be accepted or declined by a push of a button. Voice communication (Talk and Listen) is performed by using the wearable communication device's speaker and microphone. The connection to a mobile phone is performed by Bluetooth wireless technology using no-code pairing system according to the Bluetooth 4.0 protocol. This protocol allows a user to easily and rapidly pair a wearable communication device and a smartphone without having the user entering a passcode. Pairing is done only once to allow connections between the device and the phone In a preferred embodiment of the invention a wearable communication device of the present disclosure has about 3 hours of talk time and 14 days of standby time.

Watch 1 can be directly connected to a smartphone application through Bluetooth, and the smartphone can then connected to the internet "cloud" via Wi-Fi or mobile networks such as 3G or LTE.

Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the Institute of Electrical and Electronics Engineers' (IEEE) 802.11 standards.

Cloud computing is the delivery of computing and storage capacity as a service to a community of end-recipients. The name comes from the use of a cloud-shaped symbol as an abstraction for the complex infrastructure it contains in system diagrams. Cloud computing entrusts services with a user's data, software and computation over a network. Using Cloud Software as a service, users rent application software and databases. The cloud providers manage the infrastructure and platforms on which the applications run.

This allows using the watch as "remote control" for home appliances, other home devices, or any other devices via voice and buttons. The connection would be:

watch->phone (via Bluetooth, or Wi-Fi?)->IT network->appliances.

Figure 2:
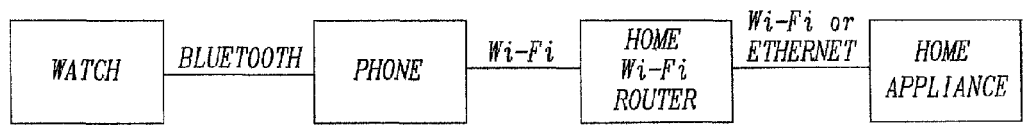
FIG. 2 illustrates examples of connections between watch and home appliances.

FIG. 2 illustrates these connections between watch and appliances using Bluetooth between watch and smartphone, using Wi-Fi between smartphone and a home Wi-Fi router, and using Wi-Fi or another communication protocol as e.g. Ethernet between the home Wi-Fi router and a home appliance as e.g. refrigerator, heating, or air-conditioner.

Another function built in the watch 1 is a GPS—or Global Positioning System—processor. This GPS processor can be used e.g. for sports and fitness, such as to track a route when hiking, running, record-keeping—and other movement tracking applications.

Figure 3:
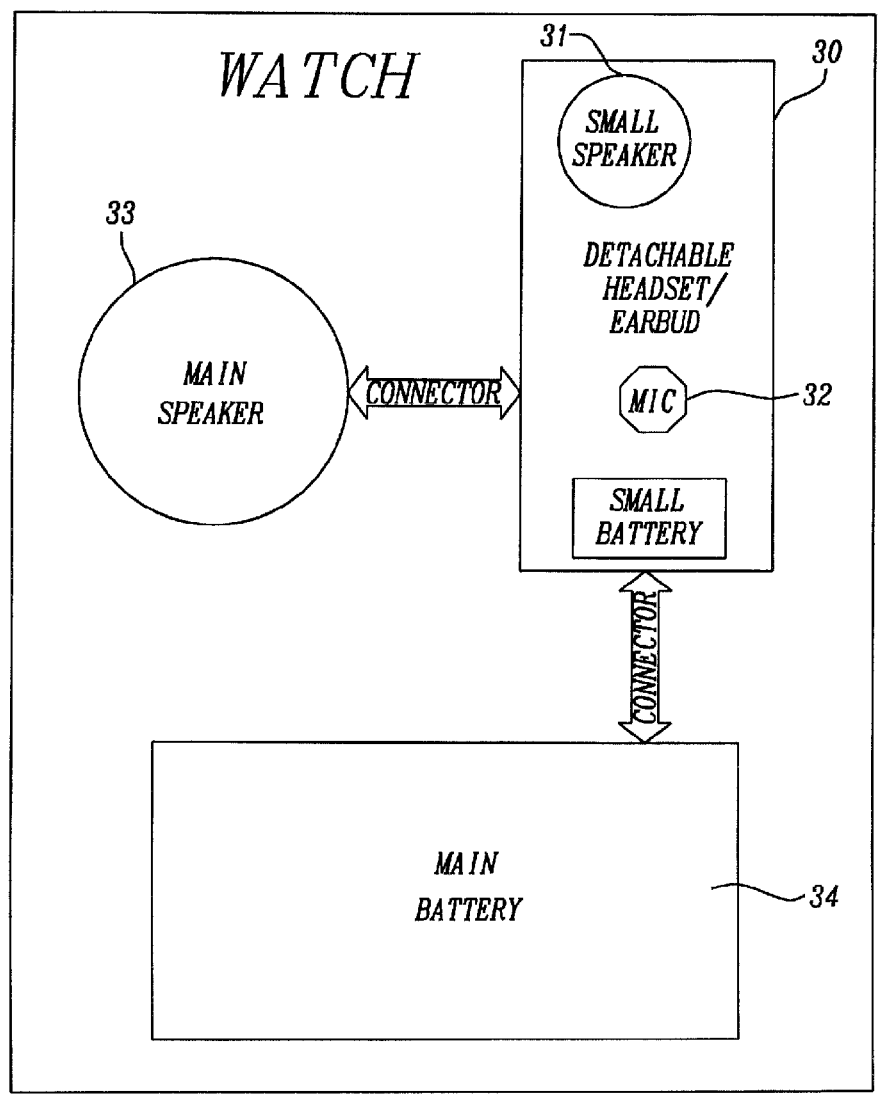
FIG. 3 shows the integration of the BT headset to the watch.

FIG. 3 shows the integration of the BT headset to the watch. FIG. 3 shows the BT headset 30 including one or two ear buds with a small speaker 31 and a microphone 32. The BT headset 30 is connected to the main speaker 33 of the watch and to the main battery 34 of the watch. A small battery 35 may be incorporated into the BT headset 30.

Another embodiment of the watch 1 integrates a Bluetooth (BT) headset. This headset could be implemented, as shown in FIG. 3, additionally to a watch having speaker and microphone in the watch body, or could be implemented instead incorporating a speaker and microphone in the watch body. The BT headset may be removable and separately powered, so that if, for example, the watch battery dies, or for the reason of privacy, the BT headset can be used. One embodiment of the watch integrates both a microphone/speaker and also a removable Bluetooth speaker ear bud. When the Bluetooth speaker ear bud is removed, the speaker switches from the watch to the ear bud. When replaced in the watch, the ear bud recharges and audio goes back to the watch known in the art typically have a quartz movement and are powered by a small battery. An analog embodiment of the watch can be integrated with Bluetooth features such that the same rechargeable battery drives both the analog watch and electronic components. Furthermore a rechargeable battery could shut down with a fixed percentage of power remaining to allow the analog watch to continue to operate for a greater length of time even though other electronic functions are shut down.

An analog watch with LED light may signal whether an alert is for an incoming call, text, or other purpose. The LED may be tri-(RGB) or multi-color, with each color signifying different types of information—text, email, voice mail, reminder, and social and the like.

Furthermore the watch is capable to transfer data sets as e.g. a contact list from one phone to another phone.

Moreover application program interfaces (API's) are provided to control the watch as e.g. to set the display on the watch, to read peripheral components as e.g. gyroscope, accelerometer, or magnetometer data, or to play/record audio using the speaker of the communication device as, and a smart phone.

The watch allows also reading sensor data using BLE (Bluetooth Low Energy), and sending the sensor data to applications on a smartphone via Bluetooth communication.

It is also possible to remotely re-configure the watch to multi-display format, i.e. to configure different language fonts, font sizes, graphical icons, orientations, and combinations thereof—all on one display.

Moreover additional features for the communication with smartphones are provided. These features include accessing a connected phone's Voice Command functions, allowing a user to place Calls, to send Voice-to-Text SMS messages, to listen to Text messages, to set calendar notifications, and to use all other voice command functions for controlling music, or other audio files such as e-books, searching the web, setting reminders and appointments, etc.

Furthermore incoming Text messages and Calendar entries are alerted via vibration, blue LED and caller ID Display. Other colors for incoming text messages or voice calls can be used as well. Incoming notifications can be processed, such as for popular web- or phone-based applications such as Facebook, Twitter, Weather, Foursquare, Gmail, Hotmail, and Yahoo Mail, and the like.

In another embodiment, a wireless leash option can be provided, notifying the user via the watch when the user's phone is inadvertently left behind and goes out of range of the watch.

The wearable communication device is enabled to support following smart-phone functions. They can be executed by the communication device if they are supported by the smart phone also. These functions comprise voice command functions allowing a user to place Calls, to send Voice-to-Text SMS messages, to listen to Text messages, to set Calendar notifications, and use all other voice command functions for controlling music, searching the web, setting reminders and appointments, etc.

While the disclosure has been particularly shown and described with reference to the preferred embodiments thereof, it will be understood by those skilled in the art that various changes in form and details may be made without departing from the spirit and scope of the disclosure.

What is claimed is:

1. A wearable communication device, comprising:
   a near-field short distance wireless communication chipset configured to communicate with a phone, wherein the chipset operates in a first energy mode and a second energy mode, the chipset has a first address for operation in the first energy mode and a second address for operation in the second energy mode, the first address indicates a first device to the phone, and the second address indicates a second device to the phone;
   at least one button assigned to at least one function of the communication device;
   a speakerphone configured to accept a first voice command to search for information, a second voice command to find a location, and a third voice command to make and receive phone calls via the phone; and
   an alerting device configured to alert a user of the wearable communication device,
   wherein the chipset comprises a first chip configured to operate in the first energy mode and a second chip configured to operate in the second energy mode, and the first chip and the second chip are configured to operate in cooperation with each other, and
   wherein the first chip and the second chip are configured to operate sequentially, and when the first chip and the second chip operate sequentially, a reduced level of power is used by the communication device relative to when the first chip and the second chip do not operate sequentially.

2. The communication device of claim 1, wherein the communication device includes a watch function.

3. The communication device of claim 1, wherein the at least one button is programmable.

4. The communication device of claim 3, wherein the at least one button is configured via a web portal.

5. The communication device of claim 3, wherein the at least one button is configured via a smartphone application.

6. The communication device of claim 3, wherein a pre-programmed configuration of the at least one button is activated by pressing the at least one button for a duration.

7. The communication device of claim 3, wherein the at least one button includes at least one of a social, messaging, and emergency configuration.

8. The communication device of claim 3, wherein the at least one button includes two programmable buttons.

9. The communication device of claim 1, wherein the at least one button includes a top button comprising:
   default functions comprising voice command activation, activate phone call, receive phone call, terminate a phone call, and pairing with the phone;
   social functions comprising reading and sensing a text message;
   safety functions comprising start and stop calling of a pre-programmed number;
   gaming and remote control functions comprising start and stop 3D motion reporting;
   audio functions comprising start and stop of playing an audio file; and
   a recording function comprising activating a voice recording.

10. The communication device of claim 1, comprising a voice recognition function and a button of the at least one button configured for voice recognition.

11. The communication device of claim 1, wherein the near-field short distance wireless communication chipset is a chipset of a short distance wireless communication technology.

12. The communication device of claim 1, wherein the first chip operates according to a first communication protocol and the second chip operates according to a second communication protocol, and the first communication protocol is different from the second communication protocol.

13. The communication device of claim 12, wherein the first chip and the second chip are configured to implement an SMS notification with a voice call.

14. The communication device of claim 12, wherein the second chip is configured for messaging.

15. The communication device of claim 1, wherein the communication device is configured to operate the first chip to communicate to the phone while the second chip communicates to a sensor.

16. The communication device of claim 1, wherein the first chip and the second chip are used as a bridge between a sensor and a smartphone application.

17. The communication device of claim 16, wherein the sensor is a home appliance sensor.

18. The communication device of claim 1, wherein the first chip receives first information and the second chip receives second information, wherein the first information and the second information are sent by the phone, and the first information is voice data.

19. The communication device of claim 1, wherein the first chip receives data from the phone and the second chip receives data from one or more sensors configured for near-field short distance wireless communication.

20. The communication device of claim 1, wherein the first device is different from the second device, and simultaneous communication between the communication device and the phone in the first mode and in the second mode is maintained.

21. The communication device of claim 1, wherein the chipset simultaneously maintains communication to the phone and to one or more sensors configured for near-field short distance wireless communication.

22. The communication device of claim 1, wherein the near-field short distance wireless communication chipset is configured to transfer data from the phone to the communication device by bumping the phone and the communication device.

23. The communication device of claim 1, wherein the connection to the phone is performed by the near-field short distance wireless communication chipset using a no-code pairing system according to a protocol, wherein the protocol is configured to pair the wearable communication device and the phone without requiring the user to enter a passcode, and wherein the pairing is completed once to pair the communication device and the phone.

24. The communication device of claim 1, wherein the communication device is further configured to support a gaming application.

25. The communication device of claim 1, further comprising a processor that controls operation of the speakerphone and the alerting device, a touch sensor connected to a capacitive touch panel, and a movement sensor, wherein the movement sensor includes one of a 3-axis accelerometer, a magnetometer, a gyroscope, and an infra-red proximity sensor, and the alerting device includes a vibration motor.

26. The communication device of claim 25, wherein the processor further controls a watch function.

27. The communication device of claim 1, wherein the phone is a smartphone that is connected to Internet.

28. The communication device of claim 27, wherein the communication device is connected to the smartphone and the smartphone is connected to the Internet via Wi-Fi or a mobile phone network.

29. A communication method comprising the steps of:
operating a near-field short distance wireless communication chipset in a wearable communication device to communicate with a phone, wherein the chipset comprises a first chip configured to operate in a first energy mode and a second chip configured to operate in a second energy mode, the chipset has a first address for operation in the first energy mode and a second address for operation in the second energy mode, the first address indicates a first device to the phone, and the second address indicates a second device to the phone;
receiving an input via at least one button on the communication device, wherein the at least one button is assigned to at least one function of the communication device;
receiving a voice command by a speakerphone of the mobile communication device, the voice command initiating a search by the phone;
alerting, by the communication device, to alert a user of the wearable communication device;
operating the first chip and the second chip in cooperation with each other; and
operating the first chip and the second chip sequentially, and when the first chip and the second chip operate sequentially, a reduced level of power is used by the communication device relative to when the first chip and the second chip do not operate sequentially.

30. The method of claim 29, wherein the phone is a smartphone.

31. The method of claim 29, wherein the at least one button is programmable.

32. The method of claim 31, wherein the at least one button is configured via a web portal.

33. The method of claim 31, wherein the at least one button is configured via a smartphone application.

34. The method of claim 31, wherein a pre-programmed configuration of the at least one button is activated by pressing the at least one button for a duration.

35. The method of claim 31, wherein the at least one button includes at least one of a social, messaging, and emergency configuration.

36. The method of claim 31, wherein the at least one button includes two programmable buttons.

37. The method of claim 31, wherein the at least one button includes a top button comprising:
default functions comprising voice command activation, activate phone call, receive phone call, terminate a phone call, and pairing with the phone;
social functions comprising reading and sensing a text message;
safety functions comprising start and stop calling of a pre-programmed number;
gaming and remote control functions comprising start and stop 3D motion reporting;
audio functions comprising start and stop playing audio files; and
a recording function comprising activating a voice recording.

38. The method of claim 31, further comprising recognizing a voice by the communication device.

39. The method of claim 29, wherein the near-field short distance wireless communication chipset is a chipset of a short distance wireless communication technology.

40. The method of claim 29, further comprising operating the first chip according to a first communication protocol and operating the second chip according to a second communication protocol, wherein the first communication protocol is different from the second communication protocol.

41. The method of claim 29, further comprising implementing an SMS notification with a voice call by the first chip and the second chip.

42. The method of claim 29, further comprising operating the second chip for messaging.

43. The method of claim 29, further comprising operating the first chip to communicate to the phone while the second chip communicates to a sensor.

44. The method of claim 43, further comprising operating the sensor, wherein the sensor is a home appliance sensor.

45. The method of claim 43, further comprising operating the first chip to receive first information and the second chip to receive second information, wherein the first information and the second information are sent by the phone, and the first information is voice data.

46. The method of claim 43, further comprising operating the first chip to receive data from the phone and operating the second chip to receive data from one or more sensors configured for near-field short distance wireless communication.

47. The method of claim 29, further comprising operating the first chip and the second chip as bridge between a sensor and a smartphone application.

48. The method of claim 29, further comprising maintaining simultaneous communication between the communication device and the phone in the first energy mode and the second energy mode, wherein the first device is different from the second device.

49. The method of claim 48, further comprising simultaneously maintaining communication to the phone and to one or more sensors configured for near-field short distance wireless communication.

50. The method of claim 29, further comprising transferring data from the phone to the communication device by bumping the phone and the communication device together.

51. The method of claim 29, further comprising connecting to the phone using a no-code pairing system according to a protocol, wherein the protocol is configured to pair the wearable communication device and the phone without requiring the user to enter a passcode, and wherein the pairing is completed once to pair the communication device and the phone.

52. The method of claim 29, wherein the phone is a smartphone that is connected to Internet.

53. The method of claim 52, further comprising directly connecting the communication device to the smartphone and the smartphone is connected to the Internet via Wi-Fi or a mobile phone network.

* * * * *